(12) United States Patent
Rode et al.

(10) Patent No.: US 7,645,324 B2
(45) Date of Patent: Jan. 12, 2010

(54) ENGINEERED ADSORBENT STRUCTURES FOR KINETIC SEPARATION

(75) Inventors: Edward J. Rode, Surrey (CA); Andre J. J. Boulet, Vancouver (CA); Aaron M. Pelman, Vancouver (CA); Matthew L. Babicki, West Vancouver (CA); Bowie G. Keefer, Galiano Island (CA); James A. Sawada, Vancouver (CA); Soheil Alizadeh-Khiavi, Burnaby (CA); Surajit Roy, Burnaby (CA); Andrea C. Gibbs, Burnaby (CA); Steven M. Kuznicki, Edmonton (CA)

(73) Assignee: Xebec Adsorption Inc., Burnaby, British Columbia (CA)

( * ) Notice: Subject to any disclaimer, the term of this patent is extended or adjusted under 35 U.S.C. 154(b) by 424 days.

(21) Appl. No.: 11/326,657

(22) Filed: Jan. 6, 2006
(Under 37 CFR 1.47)

(65) Prior Publication Data
US 2006/0169142 A1    Aug. 3, 2006

Related U.S. Application Data

(60) Provisional application No. 60/642,366, filed on Jan. 7, 2005.

(51) Int. Cl.
*B01D 53/02* (2006.01)
(52) U.S. Cl. .................. 95/96; 96/129; 96/130
(58) Field of Classification Search .......... 96/121, 96/129, 130; 95/96
See application file for complete search history.

(56) References Cited

U.S. PATENT DOCUMENTS 3,094,569 A    6/1963  Thomas
3,204,388 A    9/1965  Asker
3,513,631 A    5/1970  Seibert et al.
4,153,434 A    5/1979  Settlemyer
4,770,676 A    9/1988  Sircar et al.
4,859,217 A    8/1989  Chao
5,071,449 A *  12/1991  Sircar ........................ 95/98
5,431,716 A    7/1995  Ebbeson
5,593,478 A    1/1997  Hill et al.
5,827,358 A    10/1998  Kulish et al.
6,056,804 A    5/2000  Keefer et al.
6,063,161 A    5/2000  Keefer et al.

(Continued)

OTHER PUBLICATIONS

PCT International Search Report from the International Searching Authority dated Oct. 17, 2007.

(Continued)

*Primary Examiner*—Robert A Hopkins
(74) *Attorney, Agent, or Firm*—Klarquist Sparkman, LLP

(57) ABSTRACT

Improved adsorbent sheet based parallel passage adsorbent structures for enhancing the kinetic selectivity of certain kinetic-controlled adsorption processes, such as PSA, TSA and PPSA processes, and combinations thereof, are provided. The enhancements in kinetic selectivity made possible through the implementation of the present inventive improved adsorbent structures may unexpectedly enable significant intensification of selected kinetic adsorption processes relative to attainable performance with conventional adsorbent materials in beaded or extruded form. Such process intensification enabled by the present inventive adsorbent structures may provide for increased adsorption cycle frequencies, and increased gas flow velocities within the adsorbent beds, which may increase the productivity and/or recovery of a kinetic adsorption system incorporating the inventive adsorbent structures.

52 Claims, 6 Drawing Sheets

U.S. PATENT DOCUMENTS

| | | |
|---|---|---|
| 6,176,897 B1 | 1/2001 | Keefer |
| 6,200,365 B1 | 3/2001 | Eimer et al. |
| 6,293,998 B1 | 9/2001 | Dolan et al. |
| 6,296,823 B1 | 10/2001 | Ertl et al. |
| 6,406,523 B1 | 6/2002 | Connor et al. |
| 6,451,095 B1 | 9/2002 | Keefer et al. |
| 6,514,319 B2 | 2/2003 | Keefer et al. |
| 6,565,635 B2 | 5/2003 | Keefer et al. |
| 6,692,626 B2 | 2/2004 | Keefer et al. |
| RE38,493 E | 4/2004 | Keefer et al. |
| 6,742,507 B2 | 6/2004 | Connor et al. |
| 6,866,950 B2 | 3/2005 | Connor et al. |
| 6,902,602 B2 | 6/2005 | Keefer et al. |
| 2002/0134246 A1 | 9/2002 | Babicki et al. |
| 2002/0170436 A1 | 11/2002 | Keefer et al. |
| 2004/0118287 A1* | 6/2004 | Jaffe et al. .................. 96/121 |
| 2005/0129952 A1 | 6/2005 | Sawada et al. |

OTHER PUBLICATIONS

PCT Written Opinion of the International Searching Authority dated Oct. 17, 2007.

* cited by examiner

ENGINEERED ADSORBENT STRUCTURES FOR KINETIC SEPARATION

CROSS REFERENCE TO RELATED APPLICATION

This application claims the benefit of the earlier filing date of U.S. Provisional Application No. 60/642,366, filed on Jan. 7, 2005. The entire disclosure of provisional application No. 60/642,366 is considered to be part of the disclosure of the accompanying application and is incorporated herein by reference.

FIELD OF THE INVENTION

The present invention relates to adsorbent structures for improved performance of pressure swing adsorption and other adsorptive gas separation processes based on kinetic selectivity.

BACKGROUND OF THE INVENTION

Gas separation by pressure swing adsorption (PSA) and other adsorptive gas separation processes such as temperature swing adsorption (TSA) and partial pressure swing or displacement purge adsorption (PPSA) are achieved when a first gas component is more readily adsorbed on an adsorbent material compared to a second gas component which is relatively less readily adsorbed on the adsorbent material. In many important applications, to be described as "equilibrium-controlled" processes, the adsorptive selectivity is primarily based upon differential equilibrium uptake of the first and second components. In another important class of applications, to be described as "kinetic-controlled" processes, the adsorptive selectivity is primarily based upon the differential rates of uptake of the first and second components.

In PSA processes, a feed gas mixture containing the first and second gas components is separated by cyclic variations of pressure coordinated with cyclic reversals of flow direction in a flow path contacting a fixed bed of the adsorbent material in an adsorber vessel. In the case of TSA or PPSA processes, cyclic variations of temperature and/or partial pressure of the gas components may be coordinated with gas flow through a flow path to perform a separation. The process in any specific PSA application operates at a cyclic frequency characterized by its period, and over a pressure envelope between a first relatively higher pressure and a second relatively lower pressure. Separation in PSA is achieved by coordinating the pressure variations with the flow pattern within the flow path, so that the gas mixture in the flow path is enriched in the second component (owing to preferential adsorptive uptake of the first component in the adsorbent material) when flowing in a first direction in the flow path, while the gas mixture is enriched in the first component (which has been desorbed by the adsorbent material) when flowing in the opposite direction in the flow path. In order to achieve separation performance objectives (i.e. product gas purity, recovery and productivity), process parameters and operating conditions should be designed to achieve a sufficiently high adsorptive selectivity of the first and second components over the adsorbent material, at the cyclic frequency and within the pressure envelope.

In PSA processes designed to be equilibrium-controlled, the intrinsic adsorptive selectivity may typically be independent of cycle frequency, and depend only on the intrinsic equilibrium adsorptive preference of the adsorbent material in question relative to the fluid components in the feed fluid. The actual separation performance may be degraded by dissipative effects including mass transfer resistance and axial dispersion. The deleterious effects of mass transfer resistances associated with film (such as resulting from fluid flow boundary layer effects), macropore and micropore mass transport on equilibrium-controlled separation performance typically increase at higher gas flow velocities associated with higher cycle frequencies. Therefore the maximum practicable PSA cycle frequency which can be achieved for equilibrium-controlled separations may typically be limited by such mass transfer resistances. In order to maximize specific productivity for a given adsorbent vessel volume, it is desirable to increase cycle frequency within the constraints set by (1) performance degradation associated with mass transfer resistance and (2) adsorbent degradation as fluidization velocities of typical conventional granular packed beds are approached. While smaller adsorbent pellets may typically have lower macropore and film mass transfer resistance, it is generally impracticable to reduce pellet diameters below about 0.5 mm to about 1 mm before encountering excessive flow friction pressure gradients and the risk of fluidization and associated adsorbent pellet degradation.

As set forth in prior commonly assigned U.S. Pat. Nos. 5,082,473, 6,451,095, 6,692,626, and U.S. patent application Ser. No. 10/041,536 (the contents of which are herein incorporated by reference), equilibrium-controlled PSA processes may be enhanced by configuring the adsorbers as layered "adsorbent laminate sheet" parallel passage contactor structures, with the adsorbent material formed into adsorbent sheets, with or without suitable reinforcement materials incorporated into such sheets. As described in the above references, such adsorbent sheets may preferably be separated by spacing means, such as exemplary expanded or woven metal mesh sheet spacers, or printed spacers, establishing generally parallel fluid flow channels between adjacent surfaces of adsorbent sheets. Such parallel passage adsorbent contactor structures may be assembled according to methods known in the art, such as by the exemplary forming of the adsorbent sheets and spacing means as stacked layers or as a multi-layer spiral roll. While parallel passage adsorbers fabricated as extrudate monoliths are also known in the art, the adsorbent structures formed from multiple layers of adsorbent sheets, as described above are particularly suitable for achieving high surface area and narrow flow channels desirable for cyclic adsorptive service.

It has been established that multilayer adsorbent sheet structures can achieve favourable performance in equilibrium-controlled PSA processes where macropore diffusion dominates mass transfer resistance. The adsorbent is fully immobilized in sheet form to avoid fluidization limits of conventional granular adsorbers. Flow friction pressure drop is reduced relative to conventional packed granular beds, while macropore mass transfer resistance may be reduced by using thin adsorbent sheets. Because mass transfer and pressure drop constraints can be reduced, equilibrium-controlled PSA processes can thus be operated at high cycle frequency, for example and without limitation, up to about one cycle per second for adsorbent sheets about 250 microns thick. Therefore, compared to conventional granular (beaded) adsorbent beds, the onset of separation performance degradation due to macropore mass transfer resistance in adsorbent sheet structures can be shifted to higher operating cycle frequencies (as determined by macropore kinetics), while the inherent selectivity of the equilibrium-controlled process remains substantially unaffected.

In kinetic-controlled adsorption processes, separation over a given adsorbent material may be achieved between a first component which adsorbs and typically also desorbs relatively more rapidly at a particular cycle frequency, and a second component which adsorbs and typically desorbs relatively less rapidly at the cycle frequency. In the case of kinetic-controlled PSA processes, such adsorption and desorption are typically caused by cyclic pressure variation, whereas in the case of TSA, PPSA and hybrid processes, adsorption and desorption may be caused by cyclic variations in temperature, partial pressure, or combinations of pressure, temperature and partial pressure, respectively.

In the exemplary case of PSA, kinetic-controlled selectivity may be determined primarily by micropore mass transfer resistance (e.g. diffusion within adsorbent particles or crystals) and/or by surface resistance (e.g. narrowed micropore entrances). For successful operation of the process, a relatively and usefully large working uptake (e.g. the amount adsorbed and desorbed during each cycle) of the first component and a relatively small working uptake of the second component may preferably be achieved. Hence, the kinetic-controlled PSA process may preferably be operated at a suitable cyclic frequency, balancing between and avoiding excessively high frequencies where the first component cannot achieve a useful working uptake, and excessively low frequencies where both components approach equilibrium adsorption values.

Some established kinetic-controlled PSA processes use carbon molecular sieve adsorbents, e.g. for air separation with oxygen comprising the first more-adsorbed component and nitrogen the second less adsorbed component. Another example of known kinetic-controlled PSA is the separation of nitrogen as the first component from methane as the second component, which may be performed over carbon molecular sieve adsorbents or more recently as a hybrid kinetic/equilibrium PSA separation (principally kinetically based, but requiring thermal regeneration periodically due to partial equilibrium adsorption of methane on the adsorbent material) over titanosilicate based adsorbents such as ETS-4 (such as is disclosed in U.S. Pat. Nos. 6,197,092 and 6,315,817 to Kuznicki et. al.). These known kinetic-controlled adsorptive separation applications may be characterized by relatively low cycle frequencies and gas flow velocities, where conventional beaded or extruded adsorbents may be used in granular packed beds without resulting in fluidization. Since the cycle frequency of kinetic-controlled PSA processes is typically determined by micropore and/or surface resistance kinetics, contrasting with equilibrium-controlled PSA processes whose cycle frequency is typically limited by macropore kinetics, a system has been needed which can enable significant intensification (e.g. higher operating frequencies and gas flow velocities, and therefore resulting higher productivities and/or recoveries) of kinetic-controlled adsorption processes, such as PSA, TSA, and PPSA processes, and combinations thereof.

SUMMARY OF THE INVENTION

The present invention comprises improved adsorbent sheet based parallel passage adsorbent structures for enhancing the kinetic selectivity of certain kinetic-controlled adsorption processes, such as PSA, TSA and PPSA processes, and combinations thereof. The enhancements in kinetic selectivity made possible through the implementation of the present inventive improved adsorbent structures unexpectedly enables significant intensification of kinetic adsorption processes relative to attainable performance with conventional adsorbent materials in beaded or extruded form. Such process intensification enabled by the present inventive adsorbent structures may provide for increased adsorption cycle frequencies, and increased gas flow velocities within the adsorbent beds, which may increase the productivity of a kinetic adsorption system incorporating the inventive adsorbent structures. In particular, increases in productivity may enable the reduction in adsorbent material inventory for a given system capacity, resulting in smaller, lower cost adsorption systems, and potentially enabling the use of kinetic adsorption systems in cost and/or space sensitive separation applications for which adsorption systems were previously unviable. Alternatively, the increase in productivity resulting from kinetic process intensification may enable increased product recovery and resulting reductions in operating costs of adsorption systems incorporating the inventive adsorbent structures. Further, the inventive kinetic adsorbent structures may enable kinetic separations that could not be achieved at all with conventional adsorbents in packed bed adsorbers, due to the freedom of the inventive adsorbent structures from some limitations in cycle frequency and/or gas flow velocity suffered by conventional adsorbent materials in packed adsorber beds.

The present invention provides a kinetic-controlled adsorption process, in which separation is achieved between a first component "A" (the "fast component") which adsorbs and typically desorbs relatively more rapidly on a kinetically selective adsorbent in an adsorbent structure at a given cyclic frequency, and a second component "B" (the "slow component") which adsorbs and typically desorbs relatively less rapidly on the adsorbent at the given cycle frequency. The kinetic-controlled adsorption process may be achieved through the cyclic variation of pressure in the case of PSA, temperature in the case of TSA, and partial pressure in the case of PPSA, or the cyclic variation of a combination of these variables.

The adsorbent sheets comprising the improved adsorbent structures in the present invention may be made according to any suitable method, such as those disclosed in the Applicant's previously published U.S. patent application Ser. No. 10/041,536, which is incorporated by reference as disclosed above. A desired adsorbent material may desirably be supported as adsorbent sheet layers of a characteristic thickness "X" contacting flow channels within the adsorber structure. In an exemplary embodiment, the flow channels are typically oriented tangentially with respect to the adsorbent sheet layers. Such flow channels may typically be established by spacing means situated between adjacent adsorbent sheet layers, such as the mesh or printed spacing means disclosed in the above mentioned reference, or in other embodiments may be established by another typically sheet-like material situated between adjacent adsorbent layers, where the other material has a relatively higher fluid permeability compared to the adsorbent sheet layers, thus establishing a fluid flow channel between adsorbent sheet layers. The adsorbent sheet layers may be flat, or may be curved with a radius of curvature which typically would be much larger than the layer thickness "X". The adsorbent layers may typically comprise a macroporous matrix of microporous adsorbent particles of a characteristic radius "$r_c$", with the adsorbent macroporous matrix having a macropore void fraction "$\epsilon_p$". The microporous adsorbent particles may typically be zeolite or titanosilicate or other crystalline molecular sieve crystals or crystallites of radius "$r_c$", or alternatively could be particles or domains of an amorphous adsorbent material or gel, such as silica, alumina or carbon. Alternatively, other known adsorbent materials may be included in the adsorbent layers.

Adsorbents suitable for incorporation into the adsorbent layers of the adsorbent sheet structures according to the present invention designed for the kinetic-controlled separation of gases may be selected from any known crystalline or amorphous microporous solid exhibiting adsorbent properties, and typically having an average pore size on the order of one or more of the gas components desired to be separated.

For the separation of small molecules of similar size such as $N_2/O_2$, or propane/propylene, small-pore zeolites such as chabazite, zeolite A, or other crystalline microporous molecular sieves having pores defined by 8-membered rings (as defined by the International Zeolite Association) may be used. The composition or structure of such suitable molecular sieve materials may be modified appropriately to reduce the pore size and generate a desired kinetic selectivity defined as the ratio of the diffusivities of the gas component species into the adsorbent material.

Titanosilicate molecular sieves such as ETS-4 may be used with additional advantage to the kinetic-controlled adsorptive system (particularly PSA) design, comprising the adsorbent structures of the present invention. Unlike conventional molecular sieves, the heat of adsorption of various components on such titanosilicate molecular sieve adsorbents can be modified independently of the pore size. Furthermore, the pore size of titanosilicate molecular sieves can be precisely controlled through synthesis and/or dehydration of the adsorbent which may desirably allow a high degree of "customization" toward the target gas separation. Being able to independently vary and thereby "tune" the diffusivity constants of the desired gas components to be separated through pore size reduction and values of the heats of adsorption (and/or Henry Law adsorption constants) through compositional modification may allows additional levels of optimization, particularly in kinetic-controlled separations, and particularly in the design of kinetic-controlled PSA cycles.

The adsorbent sheet layers in the inventive adsorbent structures may include a binder to immobilize the adsorbent particles, may contain a fibrous or filamentary material for structural reinforcement, and may be attached to a support sheet or mesh or grid to form an adsorbent sheet that may have adsorbent layers on one or both sides of the sheet, such as is described in the above mentioned references disclosing methods of making adsorbent sheet structures generally.

Kinetic-controlled adsorptive selectivity may be determined primarily by micropore diffusion internal to the adsorbent particles, such as for example and without limitation zeolite or other molecular sieve crystals or crystallites of radius "$r_c$" with an intracrystalline diffusivity for the fast component of "$D_{cA}$" and for the slow component of "$D_{cB}$". Using a standard linear driving force approximation for diffusive transport, time constants for diffusion of the fast and slow gas components are for this disclosure defined as:

$$t_{cA} = \frac{r_c^2}{15 \cdot D_{cA}}$$

$$t_{cB} = \frac{r_c^2}{15 \cdot D_{cB}}$$

with the factor 1/15 reflecting the well known pulse response of approximately spherical adsorbent particles.

Alternatively, kinetic-controlled adsorptive selectivity may be determined primarily by surface resistance (for example and without limitation surface resistance due to a barrier coating or narrowed micropore entrances) of the internal adsorbent particles. With rate coefficients "$k_{sA}$" and "$k_{sB}$" for the fast and slow components, their time constants are (for surface resistance on approximately spherical adsorbent particles of radius "$r_c$") are in this case defined as:

$$t_{cA} = \frac{r_c}{3 \cdot k_{sA}}$$

$$t_{cB} = \frac{r_c}{3 \cdot k_{sB}}$$

With the above definitions of the time constants, they are given for the typical industrial kinetic-controlled PSA air separation over Bergbau-Forschung carbon molecular sieves, with oxygen comprising the fast component and nitrogen the slow component, as $t_{cA}$=25 seconds and $t_{cB}$=1130 seconds. The present invention and inventive adsorbent structures are particularly concerned with order of magnitude faster kinetic separations and rate constants where $t_{cA}$<about 2.5 seconds. The invention also addresses yet another order of magnitude faster kinetic separations and rate constants where $t_{cA}$<about 0.2 seconds, such separations having been impracticable to achieve with conventional granular adsorbent in packed beds, due to the fluidization limitation of gas flow velocities in the beds, which practically also limit the maximum cycle frequencies possible in such conventional systems to below the threshold for the fastest kinetic separations mentioned above.

Macropores in adsorbent materials have a characteristic typical tortuosity "$\tau$" and pore diffusivity "$D_p$". For the case of equimolar diffusion and with the pore diffusivity dominated by molecular diffusivity "$D_m$", $$D_p = D_m/\tau.$$

A viable kinetic-controlled adsorptive separation process provides that a usefully and relatively large working uptake (e.g. the amount adsorbed and desorbed during each cycle) of the first component and a relatively small working uptake of the second component may be desirably achieved at a given cyclic operating frequency for the process. The differential equilibrium uptakes are defined by the slopes of the adsorption isotherms as:

$$K_A = \frac{dq_A}{dc_A}$$

$$K_B = \frac{dq_B}{dc_B}$$

For the kinetic-controlled separation, an ideal selectivity is defined as:

$$S_o = \frac{K_A \cdot t_{cB}}{K_B \cdot t_{cA}}$$

or $$S_o = \frac{K_A \cdot D_{cA}}{K_B \cdot D_{cB}}$$

with $S_o \gg 1$.

The problem to be overcome by the present invention exists in adsorptive separation applications where the ideal kinetic selectivity is masked or nullified by macropore and external film mass transfer resistances. For the layered adsorbent sheet structures of the present invention, a semi-empirical kinetic selectivity is approximately defined in the linear driving force model as:

$$S = \frac{\frac{t_{cB}}{K_B} + \frac{X^2}{6 \cdot \varepsilon_p \cdot D_p}}{\frac{t_{cA}}{K_A} + \frac{X^2}{6 \cdot \varepsilon_p \cdot D_p}}$$

or $$S = \frac{\frac{r_c^2}{15 \cdot K_B \cdot D_{cB}} + \frac{X^2}{6 \cdot \varepsilon_p \cdot D_p}}{\frac{r_c^2}{15 \cdot K_A \cdot D_{cA}} + \frac{X^2}{6 \cdot \varepsilon_p \cdot D_p}}$$

In the limit of vanishing macropore resistance (either X→0 or Dp→∞), S=$S_o$. A figure of merit "F" may be defined so that a high value of "F" implies that S→So.

The multi-layered kinetic-controlled parallel passage adsorbent structure of the present invention is characterized by the inequality $$X^2 \leq \frac{6 \cdot \varepsilon_p \cdot D_p \cdot t_{cA}}{F \cdot K_A}$$

This expression may be restated, for the case of micropore diffusion kinetic control and with molecular diffusion dominating macropore diffusion, as $$X^2 \leq \frac{6 \cdot \varepsilon_p \cdot D_m \cdot r_{cA}^2}{15 \cdot F \cdot \tau \cdot K_A \cdot D_c}$$

For F<1, accordingly S<0.5*$S_o$, which indicates substantial loss of kinetic selectivity. In a desirable range of parameters for enhanced kinetic selectivity according to several embodiments of the present inventive kinetic-controlled adsorbent structure which may enable effective kinetic-controlled separation, for F>3, accordingly S>0.75*$S_o$; for F>4, S>0.80*$S_o$; for F>9, S>0.90*$S_o$; and for F>19, S>0.95*$S_o$.

Accordingly, in an embodiment according to the invention it is desirable that "F" should be in excess of unity (1) for either of the above inequalities as applicable, so that preferably F>3, more preferably F>4, yet more preferably F>9, and most preferably F>19.

The adsorption and diffusion parameters $K_A$, $k_{cA}$ and $D_{cA}$ for the fast component are representative of process conditions over the adsorbent materials for the gas mixture being separated, within the working range of gas concentrations for the fast and slow components for a PSA cycle conducted at a nominal working temperature within the inventive kinetic-controlled adsorber structure and within a working pressure envelope (between an upper pressure and a lower pressure of the PSA cycle) at the cycle frequency. Owing to nonlinear concentration sensitivity of the isotherms and micropore diffusivities, adsorption and diffusional interactions between the fast and slow components, the adsorption and diffusion parameters may in general vary with time over the PSA cycle and with location along the flow channel in the inventive adsorbent structure. To avoid ambiguity in the definition of "F", the adsorption and diffusion parameters $K_A$, $k_{cA}$ and $D_{cA}$ in the above inequalities will correspond to the concentrations of the feed gas mixture and the upper pressure of the PSA cycle.

For given adsorption and diffusion parameters in the case of micropore diffusion control, and with the adsorbent structure design parameters of the invention grouped for visibility on the left side of the inequality, an embodiment of the invention provides that $$\frac{\tau}{\varepsilon_p} \cdot \left(\frac{X}{r_c}\right)^2 \leq \frac{6 \cdot D_m}{15 \cdot F \cdot D_{cA} \cdot K_A}$$

With the adsorption and micropore diffusion parameters on the right side of the above expression corresponding to the choice of process conditions and the specific adsorbent within the inventive adsorbent structure, the geometrical parameters "X", "$r_c$", "$\varepsilon_p$," and "τ" provide the basis for engineered adsorbent structures according to the invention. These geometrical parameters may desirably be similarly designed within the invention for the case of kinetic selectivity based on surface resistance control.

In order to avoid the masking of kinetic selectivity by macropore mass transfer resistance, it is desirable that the macropore structure within the adsorbent layer be as open as possible. Hence, the macropore void fraction "$\varepsilon_p$" may desirably be relatively high, preferably in the range of about 0.5>$\varepsilon_p$>0.3 (where the lower limit corresponds approximately to conventional zeolite adsorbent pellets), and the macropore tortuosity may desirably be as close to unity as possible (τ→1.0). In some aspects of the invention, the macropore tortuosity will preferably be in the range 2.5>τ>1.0, and more preferably in the range 1.5>τ>1.0, comparing to a typical value of τ~3 for conventional zeolite adsorbent pellets.

In order to achieve a desirable high value of "F", the adsorbent layer thickness "X" may desirably be relatively low, as enabled by the adsorbent structures of the invention which may enable attainment of a first approximate range 150 μm>X>50 μm with grid, screen, mesh, cloth or fibrous supports, and of a second approximate range 50 μm>X>5 μm with adsorbent coating or film-growth techniques, such as are described in above mentioned references disclosing methods for making adsorbent sheet materials. The upper limit of the first approximate range is smaller than the smallest practical mean pellet radius in conventional granular adsorbent beds.

To achieve high "F", a large radius "$r_c$" of the adsorbent particles or zeolite crystals would be helpful. However, the objective of process intensification desirably requires high cycle frequency and gas flow velocity. For a micropore diffusion controlled kinetic PSA process, attainable cycle frequency will be inversely proportional to the square of crystal or particle radius "$r_c$". Accordingly, and subject to attainment of a satisfactory value of "F", a relatively small radius "$r_c$" would facilitate process intensification. For an embodiment of the present invention, the adsorbent particle or crystallite size range may typically be between about 10 μm>$r_c$>1 μm, or preferably between about 4 μm>$r_c$>1 μm.

It may be noted that the dimensional ranges of the adsorbent layer in its second approximate range and the adsorbent particles or crystals overlap, so that the present invention contemplates certain embodiments in which the adsorbent layer may be a monolayer coating of adsorbent particles such as zeolite crystals grown in situ on an inert support.

The invention includes a kinetic-controlled adsorption process (particularly in embodiments employing PSA) comprising the inventive adsorbent structures. Such inventive kinetic-controlled adsorption process may be operated at a cyclic frequency suited to approximately relatively maximize the working adsorptive uptake of the fast component while minimizing the working adsorptive uptake of the slow component. While the invention allows wide latitude as to the adsorption cycle (particularly PSA, but may also comprise TSA, PPSA, or combinations of all three) steps employed and the partition of the cycle period between those steps, the cycle period "T" may typically be selected in the approximate range between about $10\, t_{cA} < T < 2\, t_{cB}$.

In another embodiment of the present invention, the inventive kinetic-controlled parallel passage adsorbent structures may be used in adsorbent beds in a rotary PSA device. Suitable such rotary PSA devices may include such embodiments as disclosed in the commonly assigned U.S. Pat. Nos. RE38,493, 6,051,050, 6,451,095, and 6,565,535, the contents of which are hereby incorporated by reference. Such suitable rotary PSA devices may preferably be capable to operate as rapid cycle rotary PSA, with cycle speeds preferably in excess of about 1 cycle per minute, and more preferably in excess of about 5 cycles per minute. In addition, such suitable rotary PSA devices may typically comprise at least one rotary valve to control pressure and fluid flow in the adsorbent beds comprising the inventive kinetic-controlled adsorbent structures. This combination of at least one rotary valve with the adsorbent structures of the present invention may advantageously provide for simple control of adsorption cycle speed through changes in speed of the rotary valve, such simple control facilitating fine-tuning of adsorption cycle speed to allow optimization of kinetic-controlled adsorption separation processes within the adsorbent structure.

DETAILED DESCRIPTION OF SEVERAL EMBODIMENTS

Example 1

Prior Art

Air separation for generation of nitrogen-enriched inert gas may be performed over carbon molecular sieves and over narrow pore zeolites such as a modified 4A zeolite. Such narrow pore zeolite may typically be modified to reduce the equilibrium selectivity for nitrogen over oxygen, opposing the kinetic selectivity for oxygen as the fast component and nitrogen as the slow component. The modified 4A zeolite for this application may typically have more rapid micropore diffusion time constants than the previously commercialized carbon molecular sieves. It is of interest for the present invention, both for showing the limitations of conventional pellet packed beds for kinetic-controlled PSA processes operating at higher frequency, and for demonstrating some advantages of the present invention relative to the prior art.

Table 1 below shows relevant adsorption and micropore diffusion parameters for modified 4A zeolite, as reported in the text "Pressure Swing Adsorption" by Douglas M. Ruthven, S. Farooq and K. Knaebel, VCH Publishers, New York, 1993.

TABLE 1

|  | $D_{ci}$ (cm2/sec) | $K_i$ | $r_c$ (microns) | $t_{ci}/K_i$ (seconds) |
|---|---|---|---|---|
| oxygen | $1.6 \times 10^{-8}$ | 2.10 | 1 | 0.0198 |
| nitrogen | $4 \times 10^{-10}$ | 4.26 | 1 | 0.3912 |
| argon | $3 \times 10^{-11}$ | ~2 | 1 | 11.11 |

Figure 1:
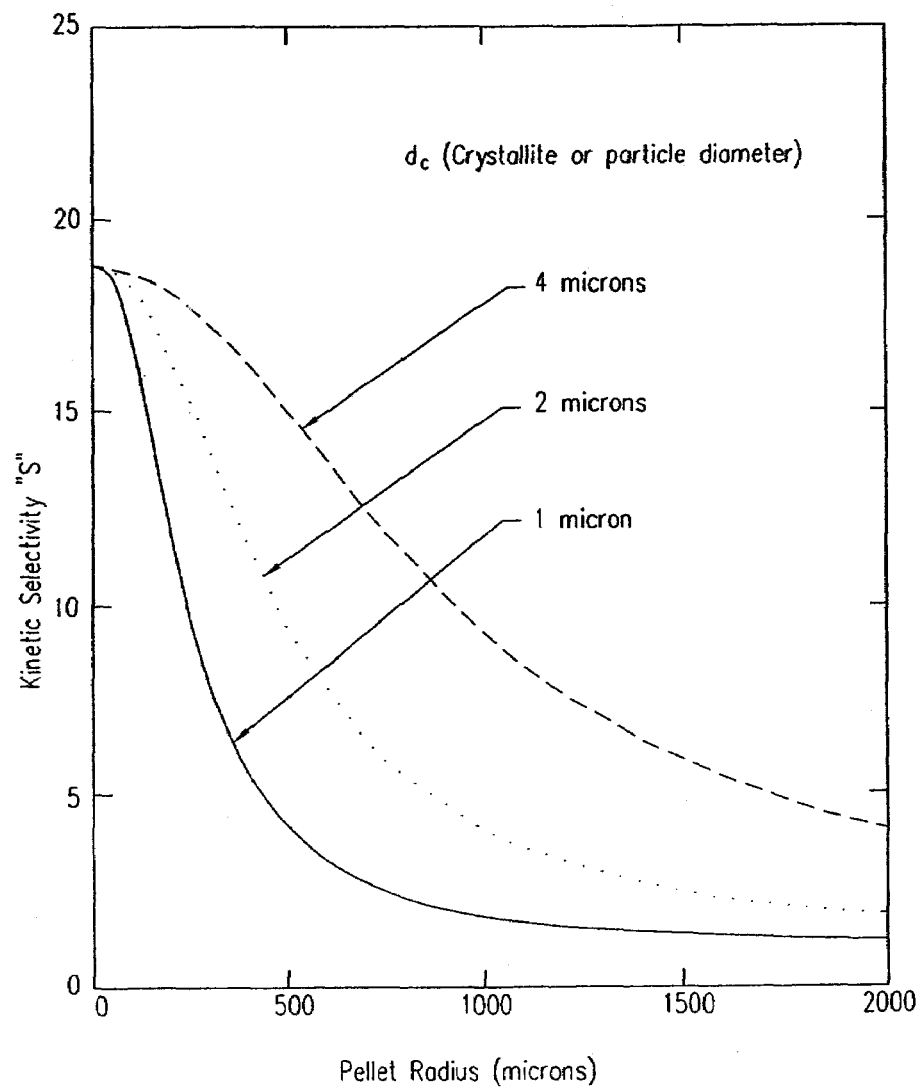
FIG. 1 shows the theoretical kinetic selectivity for air separation over a modified 4A zeolite in pellet form, indicating the dependences on pellet radius and crystallite diameter.

FIG. 1 shows the theoretical kinetic selectivity for air separation over a modified 4A zeolite in pellet form, indicating the dependences on pellet radius "R" and crystallite diameter $d_c = 2\, r_c$. These calculations are based on the following semi-empirical linear driving force approximation for kinetic selectivity "S", with additive mass transfer resistance terms in the numerator and denominator for micropore diffusion, macropore diffusion and film resistance in the approximation of stagnant flow conditions.

$$S = \frac{\frac{r_c^2}{15 \cdot K_B \cdot D_{cB}} + R^2\left(\frac{1}{15 \cdot \varepsilon_p \cdot D_p} + \frac{1}{3 \cdot D_m}\right)}{\frac{r_c^2}{15 \cdot K_A \cdot D_{cA}} + R^2\left(\frac{1}{15 \cdot \varepsilon_p \cdot D_p} + \frac{1}{3 \cdot D_m}\right)}$$

The curves for "S" versus "R" are shown for crystal diameters of 1 μm, 2 μm and 4 μm. For granular adsorbent in the small size range of 20/40 mesh (pellet diameters between 420 and 821 μm), fairly good performance is predicted ($S/S_o$~0.9) for crystal diameter 4 μm, dropping significantly ($S/S_o$~0.75) for crystal diameter 2 μm, and with severe degradation ($S/S_o$~0.5) for crystal diameter 1 μm. Clearly, superior performance may be achieved by using the larger zeolite crystals of about 4 μm diameter to obtain F>9.

Conventional kinetic-controlled PSA systems using this granular adsorbent may employ a cycle frequency of about 10 cycles/minute. Such PSA systems are used in aircraft as "onboard inert gas generation systems" to generate nitrogen as a safety measure for inerting partly empty fuel tanks.

FIG. 2

Figure 2:
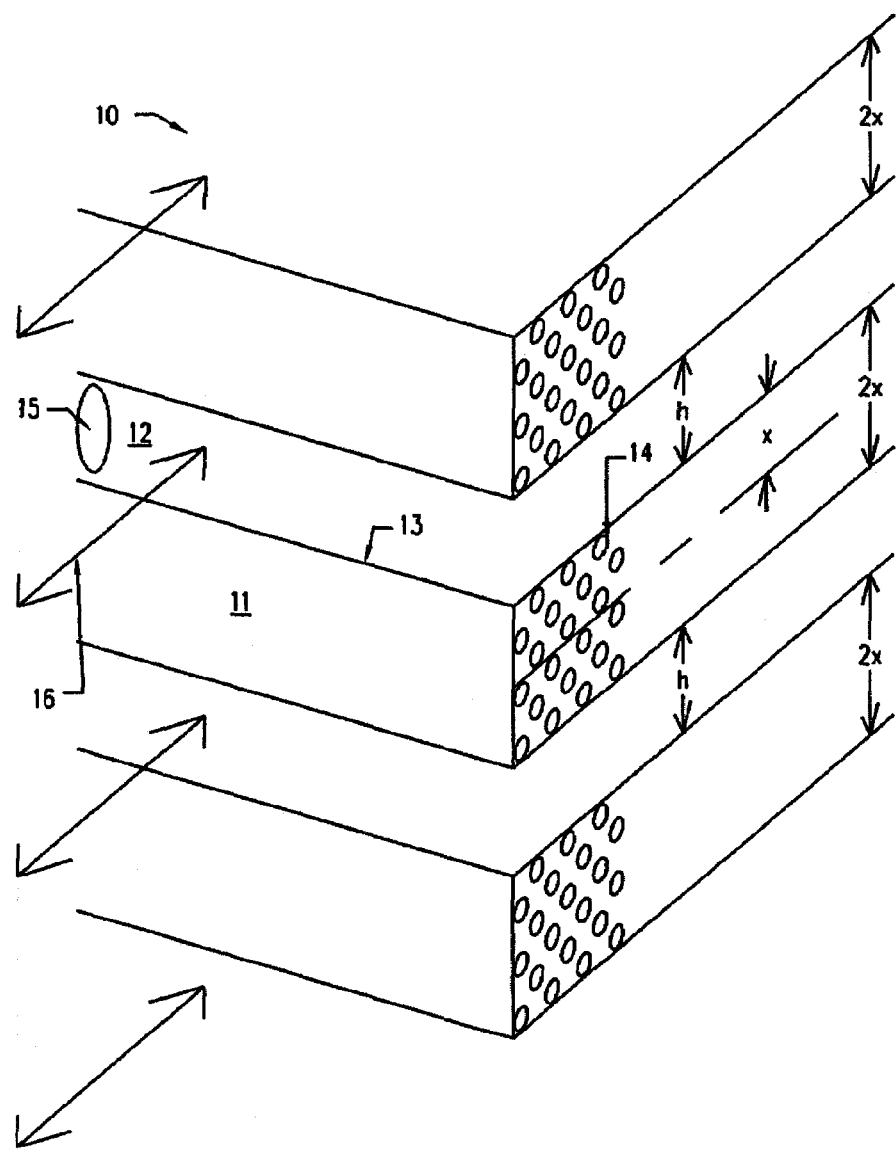
FIG. 2 is a sketch of an adsorbent laminate structure according to the invention.

FIG. 2 is a sketch of a multi-layer adsorbent sheet structure 10 according to an embodiment of the present invention. The structure 10 comprises adsorbent sheets 11 with adsorbent layers 13 of thickness "X" contacting flow channels 12 of height "h" between adjacent sheets 11, such flow channels defined by spacing means 15. The spacers establish the channel height accurately, while presenting minimal obstruction to flow in the reversing flow direction 16. The adsorbent layers 13 consist of adsorbent particles (e.g. zeolite crystals) of diameter "$d_c$". A support grid, mesh, cloth, fibrous, or other suitable reinforcement material may be included within or between the layers 13.

In additional inventive embodiments, the adsorbent layers may be coated onto an inert sheet, such as a foil for example, between two layers 13 each of thickness "X", or onto wires, whose diameter may be substantially greater than "X". In yet further embodiments of the invention, any suitable process for coating or otherwise forming an adsorbent sheet material such as are disclosed in the above mentioned references may be used to produce an adsorbent sheet structure for use in the kinetic-controlled adsorbent structures according to the present invention.

Example 2

Figure 3:
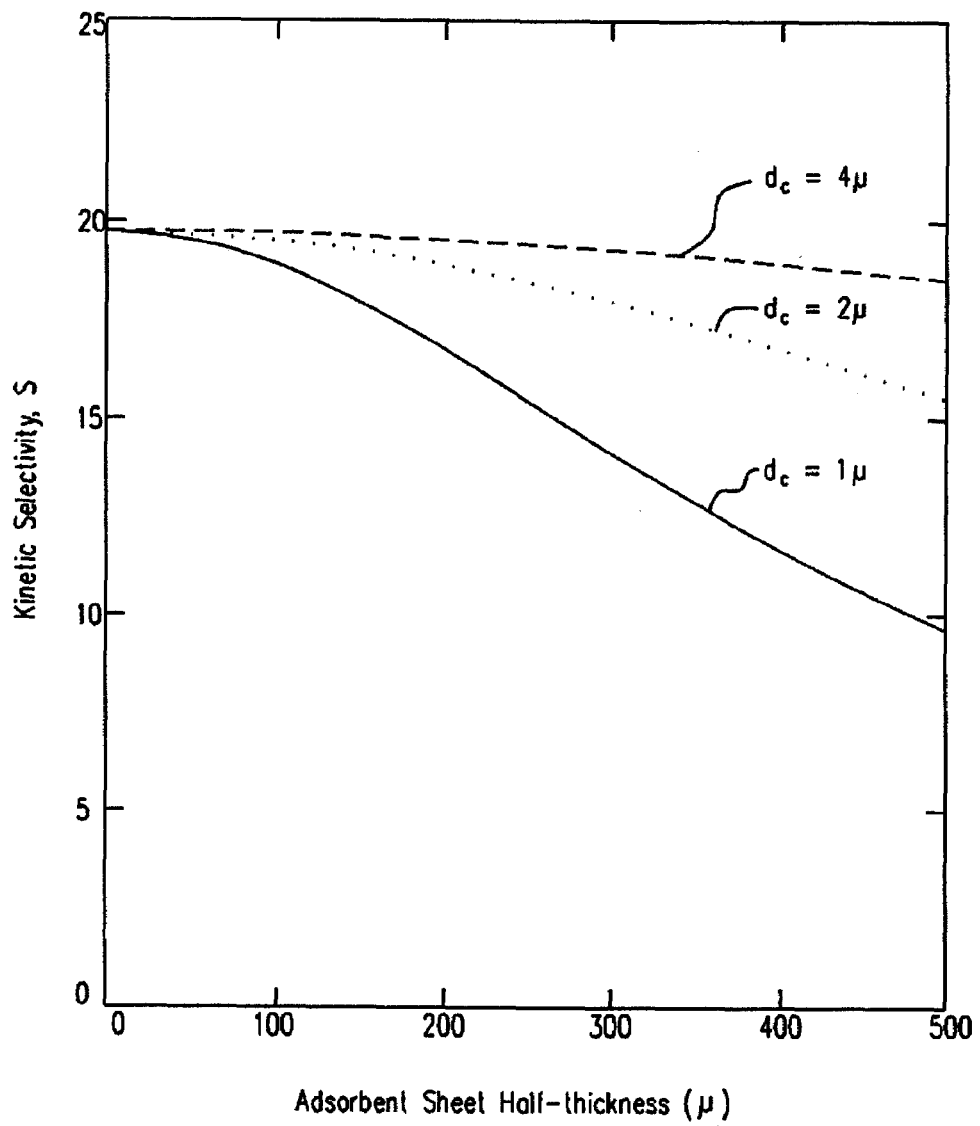
FIG. 3 shows the theoretical kinetic selectivity for air separation over a modified 4A zeolite in the adsorbent laminate of Example 2, indicating the dependences on adsorbent sheet thickness and crystallite diameter.

FIG. 3 shows the semi-empirical theoretical kinetic selectivity for air separation over a modified 4A zeolite in the adsorbent laminate of FIG. 2, using the adsorption and micropore diffusion parameters of Table 1, and indicating the dependences on adsorbent sheet thickness and crystallite diameter. These calculations are based on the following semi-empirical linear driving force approximation for kinetic selectivity "S", with additive mass transfer resistance terms in the numerator and denominator for micropore diffusion, macropore diffusion and film resistance.

$$S = \frac{\frac{r_c^2}{15 \cdot K_B \cdot D_{cB}} + X^2 \cdot \left[\frac{1}{(6 \cdot \varepsilon_p \cdot D_p)} + \frac{2}{8.235 \cdot D_m}\right]}{\frac{r_c^2}{15 \cdot K_A \cdot D_{cA}} + X^2 \cdot \left[\frac{1}{(6 \cdot \varepsilon_p \cdot D_p)} + \frac{2}{8.235 \cdot D_m}\right]}$$

Adsorbent laminate structures according to the present invention, as shown in FIG. 2, may be readily manufactured in the first approximate thickness range of 150 μm>X>50 μm, such that X=100 μm, $S/S_o$>0.9 (F>9) may achieved for all crystal sizes in the range of 1 μm upward, while $S/S_o$>0.95 (F>19) may achieved for all crystal sizes in the range of 2 μm upward. For particular embodiments of the present invention, it is preferred that the above properties of the inventive kinetic-controlled adsorbent structures be selected to maximize the value of $S/S_o$.

The unexpected advantages of the present invention in this exemplary application may now be made apparent with comparison to the conventional 20/40 mesh granular adsorbent bed of Example 1, recalling that crystal diameter below 4 μm in the 20/40 mesh adsorbent will result in significant macropore degradation of kinetic selectivity, and also recalling that cycle frequency can be intensified by a factor of substantively 4 when the zeolite crystal diameter is reduced by a factor of 4. In addition to the intensification of the cycle frequency, the gas flow velocity within the adsorbent structure of the present invention is not limited to the relatively low levels required to avoid fluidization as are conventional packed granular adsorbent beds. The combination of such increases in cycle frequency and gas flow velocity in the inventive systems and processes may provide desirable increases in productivity, and/or recovery.

The inventive adsorbent structures may use zeolite crystals of 2 μm diameter to achieve a 4-fold intensification (increasing cycle frequency from 10 to 40 cycles/minute), while also improving kinetic selectivity and thus separation performance with $S/S_o$~0.95 (F>19). Alternatively, the inventive adsorbent structure may use zeolite crystals of 1 μm diameter to achieve a 16-fold intensification (increasing cycle frequency toward 160 cycles/minute), while retaining approximately equal kinetic selectivity and thus separation performance with $S/S_o$~0.9 (F>9).

It will be appreciated that a 4-fold or 16-fold intensification, proportionately reducing the volume and weight of the adsorbers, is extremely desirable for aviation onboard fuel tank inerting, and any other application where greater recovery and/or productivity (which may also contribute to smaller size and/or lower capital cost) is advantageous for an adsorptive separation system. The inventive adsorbent structure is also inherently more robust and tolerant of aircraft shock/vibration exposure than granular adsorbent, or physical shock or stress from any other application specific exposure.

Example 3

Example 3 considers a kinetic-controlled adsorptive separation with faster time constants and somewhat stronger equilibrium adsorption. The specific parameters used are $t_{cA}$=0.025 seconds $t_{cB}$=2.5 seconds $K_A$=22 $K_B$=26

These adsorption and micropore kinetic parameters may apply to the industrially important application of propylene/propane separation. Useful kinetic and equilibrium data is provided for that separation over AlPO-34 and AlPO-18 adsorbents in U.S. Pat. Nos. 6,730,142 and 6,733,572, both by Reyes et al. That data suggests that this olefin/paraffin PSA separation may best be conducted at elevated temperatures of 423 K or even higher, with the present model indicating the desirability of such elevated temperature to avoid excessively high values of $K_A$.

Figure 4:
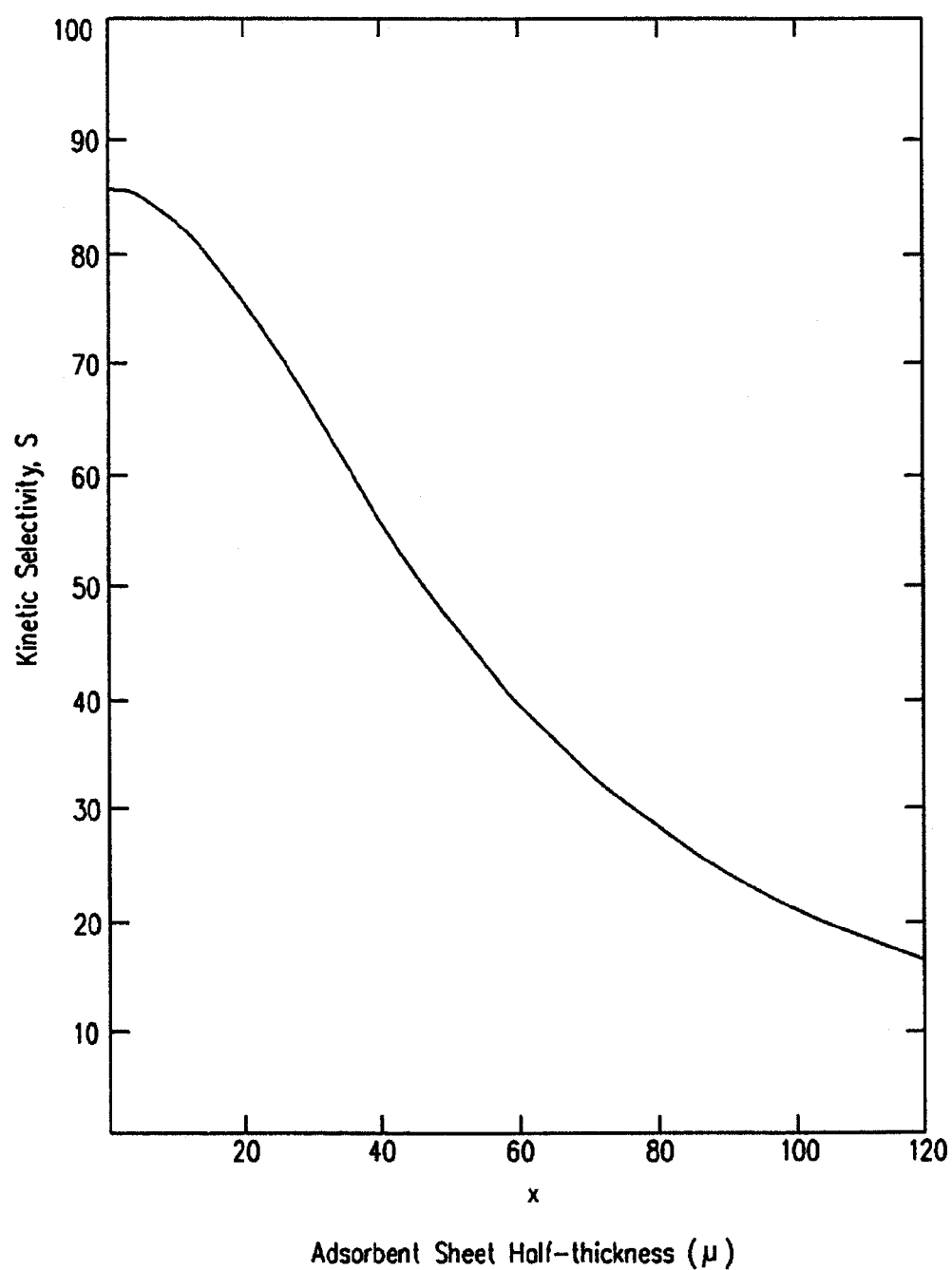
FIG. 4 shows the theoretical kinetic selectivity for the adsorbent laminate of Example 3 indicating the dependence on adsorbent sheet thickness.

FIG. 4 shows the theoretical kinetic selectivity for the adsorbent laminate of Example 3 indicating the dependence on adsorbent sheet thickness for the above parameters. It is seen that adsorbent layer thicknesses in the second approximate thickness range of 50 μm>X>5 μm may be necessary, as $S/S_o$~0.5 (F~1) for X~50 μm. For $S/S_o$>0.9 (F>9), the adsorbent layer may be a thin crystal coating of X~15 μm.

Example 4

Figure 5:
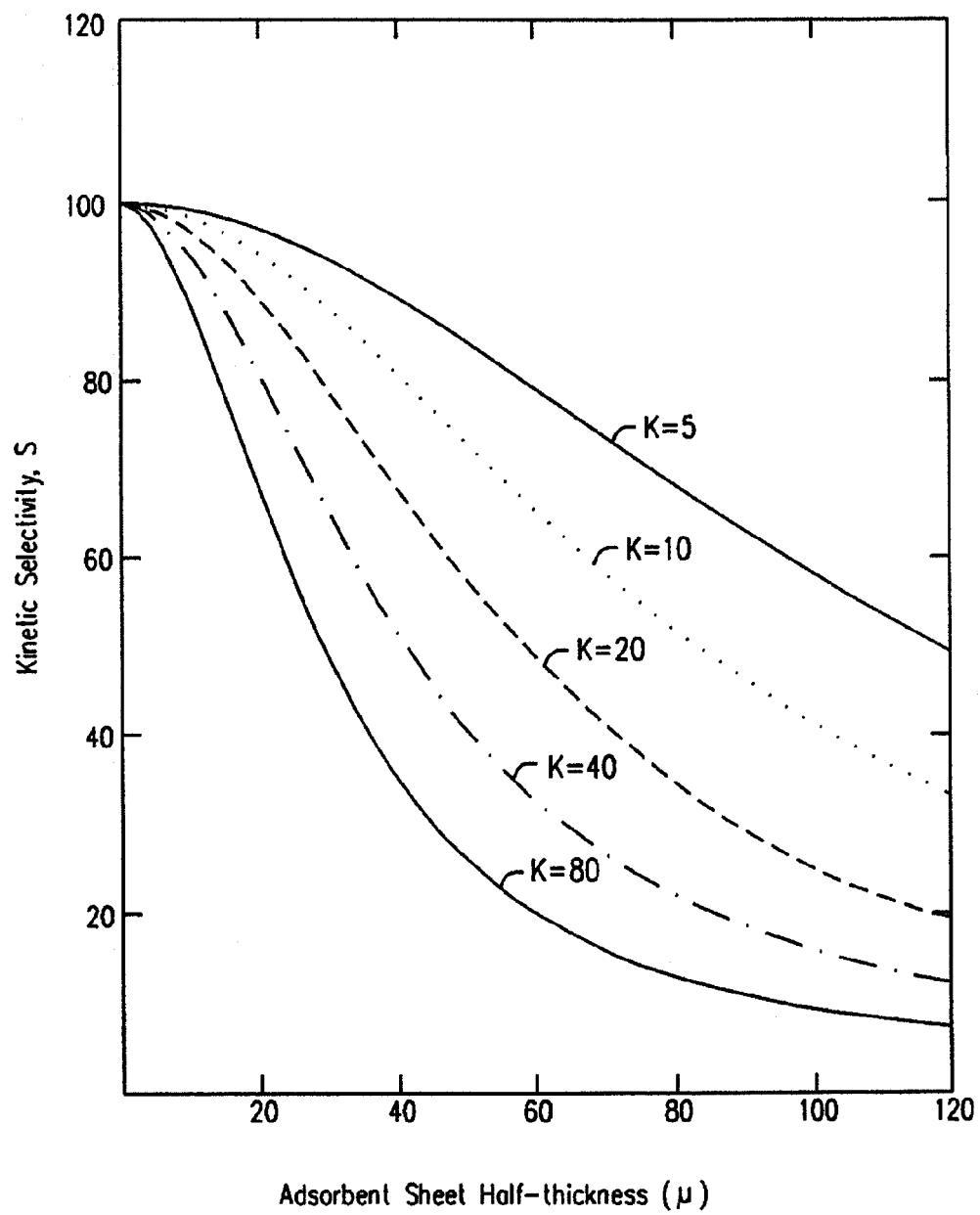
FIG. 5 shows the theoretical kinetic selectivity for the adsorbent laminate of Example 4 indicating the dependences on adsorbent sheet thickness and the adsorption isotherm slope.
Figure 6:
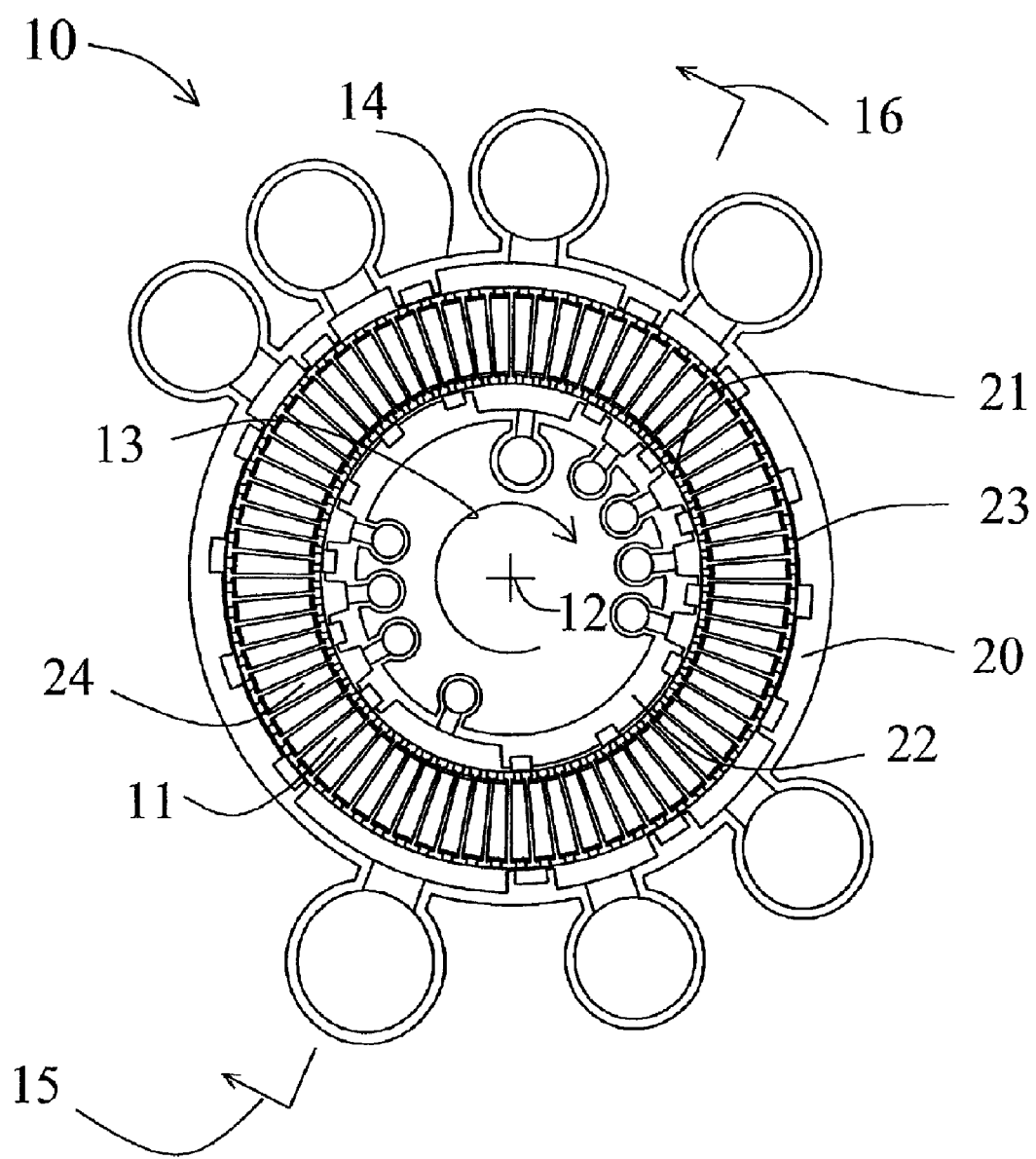
FIG. 6 is a sectional view of one embodiment of a rotary PSA module.

Example 4 generalizes similar cases to Example 3, exploring the sensitivity to changes of the isotherm slope. FIG. 5 shows the theoretical kinetic selectivity for the adsorbent laminate of Example 4 indicating the dependence on adsorbent sheet thickness and the adsorption isotherm slope K. For simplicity, K=$K_A$=$K_B$, and again $t_{cA}$=0.025 seconds and $t_{cB}$=2.5 seconds.

As seen in FIG. 5, the adsorbent layer thickness may be increased to e.g. X~50 μm for K~5 if $S/S_o$~0.8 (F~4) is acceptable. Such low values of $K_A$ may be achieved by operating at high temperature and high on the isotherm (approaching saturation), or indirectly by increasing $\varepsilon_p$.

Conversely, relatively high values of K>80 may compel use of very thin adsorbent layers down to the range of 10 μm>X>5 μm. Such thin layers may be provided as monolayer crystal coatings on an adsorbent sheet structure according to the present invention. In order to avoid excessive channel voidage in the adsorber, the equivalent channel height "h" may need to be in a comparable range, e.g. 20 μm>h>5 μm.

Some relief from the need for very thin adsorbent layer coatings (and corresponding narrow flow channels) on the adsorbent sheet comprising the inventive adsorbent structures may be provided by designing for surface resistance control rather than bulk micropore resistance control within the adsorbent crystals or particles. The bulk adsorbent crystal or particle may be a microporous material having relatively fast micropore diffusivity, and with the micropores narrowed at the crystal or particle surface by hydrothermal treatment, silanation, or a thin overlay coating (e.g. ~1 μm thick) of a micropore-selective material such as AlPO-34 for example.

Example 5

Example 5 represents a kinetic-controlled adsorptive separation using adsorbent structures according to the present invention. Modified zeolitic silicate type adsorbent materials with micropores in the size range of about 2-5 angstroms may show a molecular sieving effect, and may be suitable for use as a kinetic-controlled adsorbent material, for incorporation in the kinetic-controlled adsorbent structures of the invention. Using such modified zeolitic silicate type adsorbent materials in the inventive adsorbent structures, methane may be separated from carbon dioxide in a mixture of the two gases using a kinetic-controlled adsorptive separation process.

The macropore and film mass transfer resistances may be suitably reduced for enhancing kinetic-controlled adsorption in such materials by proper design of the inventive adsorbent structures incorporating the materials, and through adsorptive separation operation under appropriate process conditions. Under such circumstances, micropore resistance may be found to control the kinetic-controlled adsorptive separation process. Under such conditions and using inventive adsorbent structures comprising such zeolitic silicate materials and corresponding to such physical characteristics as shown in Table 2 below, the ideal kinetic-controlled adsorptive selectivity, $S_0$ may be as high as around 100 for the kinetic-controlled process for separation of carbon dioxide from methane, which may be very favorable for effective separation.

The diffusivity of $CH_4$ on such modified zeolitic silicate adsorbent materials may be relatively fast, resulting in very small values for the adsorption time constant of about ~0.1 seconds. The kinetic-controlled adsorption cycle may preferably be designed and operated in such a way that the longest time period of the adsorption cycle may be shorter in duration than the adsorption time constant of methane on the adsorbent material incorporated in the inventive adsorbent structure, to desirably reduce significant adsorption of methane in the adsorbent. Therefore the adsorption process cycle speed in this application may preferably be in the range of orders of magnitude faster than conventional beaded PSA systems, such that at such rapid cycle speeds $CO_2$ may adsorb on the adsorbent material based on its relatively rapid diffusion rate, but that adsorption of methane may be desirably minimized.

TABLE 2

|  | $D_{ci}$ (cm2/sec) | $K_i$ | $r_c$ (microns) | $t_{ci}/K_i$ (seconds) |
|---|---|---|---|---|
| Carbon Dioxide | ~5 × 10$^{-7}$ | ~40.0 | 2~5 | 0.001 |
| Methane | ~6 × 10$^{-9}$ | ~20.0 | 2~5 | 0.14 |
| Nitrogen | ~3 × 10$^{-7}$ | ~15.0 | 2~5 | 0.004 |

Example 6

Example 6 represents a further embodiment of the present invention directed toward enabling the kinetic-controlled adsorptive separation of $CH_4$ from $N_2$ using a structured adsorbent bed comprising the present inventive kinetic-controlled adsorbent structures. Silicate materials with modified micropore structures may desirably be used for this separation, in a case which is similar to that disclosed above in Example 5. The appropriate values for diffusivity, Henry's constant, and adsorbent material crystal sizes for such an application are shown above in Table 2. In such an application, an effective kinetic-controlled selectivity may be defined such that the inventive adsorbent structures may be optimized to enhance the separation of $CH_4$ from $N_2$ by the relatively more rapid adsorption of nitrogen, and relatively less rapid adsorption of methane on such suitable adsorbent materials.

As disclosed in the above examples, the inventive kinetic-controlled adsorbent structures may be applied to many different adsorptive separation processes, incorporating any suitable adsorbent materials, such as those known in the art.

The present invention has been described above in reference to several exemplary embodiments. It is understood that further modifications may be made by a person skilled in the art without departing from the spirit and scope of the invention which are to be determined by the following claims.

We claim:

1. A multi-layer parallel passage adsorbent structure for use in an adsorptive separation between at least a first more rapidly adsorbed gas component and a second less rapidly adsorbed gas component comprising:

an adsorbent structure having a tortuosity of 2.5>t>1.0, the adsorbent structure comprising a plurality of adsorbent sheets comprising at least one adsorbent material, the adsorbent material being coated on each of the plurality of sheets and having an adsorbent layer thickness X, the at least one adsorbent material comprising particles having a radius $r_c$, micropores of from about 0.0002 μm to about 0.0005 μm, and an ideal kinetic selectivity $S_0$ between the first and second components, wherein the thickness X and the adsorbent particle radius $r_c$ are selected to maximize the value of an effective kinetic selectivity S of the adsorbent structure, the adsorptive separation having a cycle period T, such that T is in the range between about 10 $t_{cA}$<T<2 $t_{cB}$ with $t_{cA}$ and $t_{cB}$ being time constants for diffusion of the first more rapidly adsorbed gas component and the second less rapidly adsorbed gas component, respectively; and spacing means between the multiplicity of adsorbent sheets to define flow channels between adjacent adsorbent sheets.

2. The adsorbent structure according to claim 1 wherein the rapid cycle kinetic-controlled adsorptive separation is a rapid cycle kinetic-controlled PSA separation.

3. The adsorbent structure according to claim 2 wherein the value of the ratio of the effective kinetic selectivity of the adsorbent structure to the ideal kinetic selectivity of the at least one adsorbent material, $S/S_0$, is at least 0.75.

4. The adsorbent structure according to claim 2 wherein the value of the ratio of the effective kinetic selectivity of the adsorbent structure to the ideal kinetic selectivity of the at least one adsorbent material, $S/S_0$, is at least 0.80.

5. The adsorbent structure according to claim 2 wherein the value of the ratio of the effective kinetic selectivity of the adsorbent structure to the ideal kinetic selectivity of the at least one adsorbent material, $S/S_0$, is at least 0.9.

6. The adsorbent structure according to claim 2 wherein the value of the ratio of the effective kinetic selectivity of the adsorbent structure to the ideal kinetic selectivity of the at least one adsorbent material, $S/S_0$, is at least 0.95.

7. The adsorbent structure according to claim 2 wherein the at least one adsorbent material comprises a zeolitic silicate molecular sieve, the first more rapidly adsorbed gas component comprises carbon dioxide, and the second less rapidly adsorbed gas component comprises methane.

8. The adsorbent structure according to claim 2 wherein the at least one adsorbent material comprises a zeolitic silicate molecular sieve, the first more rapidly adsorbed gas component comprises nitrogen, and the second less rapidly adsorbed gas component comprises methane.

9. The adsorbent structure according to claim 7 wherein the value of the ratio of the effective kinetic selectivity of the adsorbent structure to the ideal kinetic selectivity of the at least one adsorbent material, $S/S_0$, is at least 0.75.

10. The adsorbent structure according to claim 7 wherein the value of the ratio of the effective kinetic selectivity of the adsorbent structure to the ideal kinetic selectivity of the at least one adsorbent material, $S/S_0$ is at least 0.80.

11. The adsorbent structure according to claim 7 wherein the value of the ratio of the effective kinetic selectivity of the adsorbent structure to the ideal kinetic selectivity of the at least one adsorbent material, $S/S_0$ is at least 0.9.

12. The adsorbent structure according to claim 7 wherein the value of the ratio of the effective kinetic selectivity of the adsorbent structure to the ideal kinetic selectivity of the at least one adsorbent material, $S/S_0$ is at least 0.95.

13. The adsorbent structure according to claim 8 wherein the value of the ratio of the effective kinetic selectivity of the adsorbent structure to the ideal kinetic selectivity of the at least one adsorbent material, $S/S_0$, is at least 0.75.

14. The adsorbent structure according to claim 8 wherein the value of the ratio of the effective kinetic selectivity of the adsorbent structure to the ideal kinetic selectivity of the at least one adsorbent material, $S/S_0$ is at least 0.80.

15. The adsorbent structure according to claim 8 wherein the value of the ratio of the effective kinetic selectivity of the adsorbent structure to the ideal kinetic selectivity of the at least one adsorbent material, $S/S_0$ is at least 0.9.

16. The adsorbent structure according to claim 8 wherein the value of the ratio of the effective kinetic selectivity of the adsorbent structure to the ideal kinetic selectivity of the at least one adsorbent material, $S/S_0$ is at least 0.95.

17. The adsorbent structure according to claim 1 where the adsorbent is selected from titanosilicate, silica, alumina, chabazite, zeolite A, microporous molecular sieves having an 8-membered pore ring, Bergbau-Forschung CMS, and combinations thereof.

18. The adsorbent structure according to claim 1 where the micropores are narrowed by hydrothermal treatment, silanation, an overlay coating, or a micropore-selective material.

19. The adsorbent structure according to claim 18 where the micropore selective material is a chabazite.

20. The adsorbent structure according to claim 19 where the chabazite is AlPO-34.

21. The adsorbent structure according to claim 18 where the micropores are narrowed from a first size greater than 0.0005 microns to a second size within a range of from 0.0002 microns to 0.0005 microns.

22. The adsorbent structure according to claim 18 where the micropores are narrowed from a first size within a range of from 0.0002 microns to 0.0005 microns to a second smaller pore size.

23. The adsorbent structure according to claim 18 where the adsorbent material is a titanosilicate and the micropores are narrowed by dehydration.

24. The adsorbent structure according to claim 18 where the adsorbent material is a titanosilicate and the micropores are narrowed by hydrothermal treatment.

25. A rapid cycle rotary PSA devices comprising:
at least one rotary valve with at least one adsorbent structure that can be operated at a cycle frequency selected to enable a rapid cycle kinetic separation;
the adsorbent structure having a tortuosity of $2.5>t>1.0$, the adsorbent structure comprising a multi-layer parallel passage adsorbent structure adapted for implementing a rapid cycle kinetic-controlled adsorptive separation between at least a first more rapidly adsorbed gas component and a second less rapidly adsorbed gas component, such adsorbent structure comprising a plurality of adsorbent sheets comprising at least one adsorbent material the adsorbent material being coated on each of the plurality of adsorbent sheets and having an adsorbent layer thickness X, the at least one adsorbent material layer comprising particles of the at least one adsorbent material having an ideal kinetic selectivity $S_0$ between the first and second components, the particles having an adsorbent particle radius $r_c$, micropores of from about 0.0002 µm to about 0.0005 µm, and wherein the adsorbent layer thickness X and adsorbent particle radius $r_c$ are selected to maximize the value of an effective kinetic selectivity S of the adsorbent structure for implementing the rapid-cycle kinetic-controlled adsorptive separation, relative to the ideal kinetic selectivity $S_0$ of the at least one adsorbent material, and wherein the adsorptive separation has a cycle period T, such that T is in the range between about $10\ t_{cA}<T<2\ t_{cB}$ wherein $t_{cA}$ and $t_{cB}$ are time constants for diffusion of the first more rapidly adsorbed gas component and the second less rapidly adsorbed gas component, respectively, the plurality of adsorbent sheets being separated by spacing means to define flow channels therebetween.

26. The adsorbent structure according to claim 25 wherein the rapid cycle kinetic-controlled adsorptive separation is a rapid cycle kinetic-controlled PSA separation.

27. The adsorbent structure according to claim 26 wherein the value of the ratio of the effective kinetic selectivity of the adsorbent structure to the ideal kinetic selectivity of the at least one adsorbent material, $S/S_0$, is at least 0.75.

28. The adsorbent structure according to claim 26 wherein the value of the ratio of the effective kinetic selectivity of the adsorbent structure to the ideal kinetic selectivity of the at least one adsorbent material, $S/S_0$ is at least 0.80.

29. The adsorbent structure according to claim 26 wherein the value of the ratio of the effective kinetic selectivity of the adsorbent structure to the ideal kinetic selectivity of the at least one adsorbent material, $S/S_0$ is at least 0.9.

30. The adsorbent structure according to claim 26 wherein the value of the ratio of the effective kinetic selectivity of the adsorbent structure to the ideal kinetic selectivity of the at least one adsorbent material, $S/S_0$ is at least 0.95.

31. A method for performing a kinetic adsorptive separation to separate at least a first more rapidly adsorbed gas component from a second less rapidly adsorbed gas component in a gas mixture comprising the first and second components, the method comprising:
feeding a feed fluid comprising the gas mixture to an adsorptive separation apparatus housing an adsorbent structure having a tortuosity of $2.5>t>1.0$, the adsorbent structure comprising a plurality of adsorbent sheets and at least one adsorbent material, the adsorbent material being coated on each of the plurality of adsorbent sheets, and having a material layer thickness X, the at least one adsorbent layer comprising particles of the at least one adsorbent material having a radius $r_c$, micropores of from about 0.0002 µm to about 0.0005 µm, and an ideal kinetic selectivity $S_0$ between the first and second components, wherein the thickness X and the adsorbent particle radius $r_c$ are selected to maximize the value of an effective kinetic selectivity S of the adsorbent structure, and spacing means between the multiplicity of adsorbent sheets to define flow channels between adjacent adsorbent sheets; and
operating the device to provide a cycle period T selected to enable a kinetic separation of the first gas component from the second gas component such that T is in the range between $10\ t_{cA} < T < 2\ t_{cB}$ wherein $t_{cA}$ and $t_{cB}$ are time constants for diffusion of the first more rapidly adsorbed gas component and the second less rapidly adsorbed gas component, respectively.

32. The method according to claim 31 where the device is a pressure swing adsorption device.

33. The method according to claim 31 where the device is a temperature swing device.

34. A method for kinetically separating a first more rapidly adsorbed fluid from a second less rapidly adsorbed fluid in a fluid mixture, comprising:
selecting a suitable adsorbent material having a selected particle radius for preferentially kinetically adsorbing the first fluid;
providing an adsorbent laminate structure having a tortuosity of $2.5 > t > 1.0$, the adsorbent laminate structure comprising an adsorbent material, the adsorbent material being coated onto a sheet in a material layer having a material layer thickness suitable for preferentially kinetically adsorbing the first fluid, the adsorbent material comprising adsorbent material particles having a radius $r_c$ and micropores of from about 0.0002 μm to about 0.0005 μm;
feeding the gas mixture to an adsorptive separation device housing the adsorbent laminate structure;
selecting a cycle speed for kinetically separating the first fluid from the second fluid; and
operating the device at the selected cycle speed to separate the first fluid from the second fluid.

35. The method according to claim 34, where the absorbent material is selected from titanosilicates, chabazites, crystalline microporous molecular sieves having pores defined by 8-membered rings, and combinations thereof.

36. The method according to claim 34, where the absorbent material is selected from zeolite A, AlPO-34, AlPO-18, ETS-4, and combinations thereof.

37. The method accord to claim 34 where the fluid mixture comprises methane and nitrogen.

38. The method accord to claim 34 where the fluid mixture comprises methane and carbon dioxide.

39. The method accord to claim 34 where the fluid mixture comprises methane and hydrogen.

40. The method accord to claim 34 where the fluid mixture comprises a hydrocarbon.

41. The method accord to claim 34 where the fluid mixture comprises an olefin and a paraffin.

42. The method accord to claim 34 where the fluid mixture comprises propylene and propane.

43. The method according to claim 34 where the first more rapidly adsorbed fluid and the second less rapidly adsorbed fluid have a diffusion time constant sufficiently different to allow a kinetic separation.

44. A kinetic separation method, comprising:
feeding a gas mixture comprising propylene and propane, where propylene and propane have diffusion time constants sufficiently different to allow a kinetic separation, to a pressure swing adsorption apparatus comprising at least one rotary valve and at least one multi-layer parallel passage adsorbent structure adapted for implementing a rapid cycle kinetic-controlled adsorptive separation, the adsorbent structure having a tortuosity of $2.5 > t > 1.0$ and comprising a plurality of adsorbent sheets comprising at least one adsorbent material, the adsorbent material being coated on each of the plurality of sheets and having adsorbent layer thickness of greater than 5 μm and less than 150 μm, the at least one adsorbent material layer comprising particles of the at least one adsorbent material having an ideal kinetic selectivity $S_0$ between the first and second components, the particles having an adsorbent particle radius $r_c$, and micropores of from about 0.0002 μm to about 0.0005 μm, the plurality of adsorbent sheets being separated by spacing means to define flow channels therebetween; and
operating the device at a cycle speed selected to kinetically separate propylene from propane.

45. The method according to claim 44 where propane has a diffusion time constant $t_{cA}$ and propylene has a diffusion time constant $t_{cB}$, where $t_{cB}$ is at least 5 times $t_{cA}$.

46. The method according to claim 44 where propane has a diffusion time constant $t_{cA}$ of 0.025 second and propylene has a diffusion time constant $t_{cB}$ of about 2.5 seconds.

47. A kinetic separation method, comprising:
feeding a gas mixture comprising oxygen and nitrogen, where oxygen and nitrogen have diffusion time constants sufficiently different to allow a kinetic separation, to a pressure swing adsorption apparatus comprising at least one rotary valve and at least one multi-layer parallel passage adsorbent structure adapted for implementing a rapid cycle kinetic-controlled adsorptive separation, the adsorbent structure having a tortuosity of $2.5 > t > 1.0$ and comprising a plurality of adsorbent sheets comprising at least one adsorbent material, the adsorbent material being coated on the sheets and having an adsorbent layer thickness of greater than 5 μm and less than 150 μm, the at least one adsorbent material layer comprising particles of the at least one adsorbent material having an ideal kinetic selectivity $S_0$ between the first and second components, the particles having an adsorbent particle radius $r_c$, and micropores of from about 0.0002 μm to about 0.0005 μm, the plurality of adsorbent sheets being separated by spacing means to define flow channels therebetween; and
operating the device at a cycle speed selected to kinetically separate oxygen from nitrogen.

48. The method according to claim 47 where oxygen has a diffusion time constant $t_{cA}$ and nitrogen has a diffusion time constant $t_{cB}$, where $t_{cB}$ is at least 5 times $t_{cA}$.

49. The method according to claim 47 where oxygen has a diffusion time constant $t_{cA}$ of 0.025 second and nitrogen has a diffusion time constant $t_{cB}$ of about 2.5 seconds.

50. A kinetic separation method, comprising:
feeding a gas mixture comprising methane and at least one other fluid to a pressure swing adsorption apparatus comprising at least one rotary valve and at least one multi-layer parallel passage adsorbent structure adapted for implementing a rapid cycle kinetic-controlled adsorptive separation, the adsorbent structure having a tortuosity of $2.5 > t > 1.0$ and comprising a plurality of adsorbent sheets comprising at least one zeolitic silicate type adsorbent material, the adsorbent material comprising particles having an adsorbent particle radius $r_c$, and micropores of from about 0.0002 μm to about 0.0005 μm, the adsorbent material being coated on the sheets and having an adsorbent layer thickness of greater than 5 μm and less than 150 μm, the plurality of adsorbent sheets being separated by spacing means to define flow channels therebetween; and
operating the device at a cycle speed selected to kinetically separate methane from the at least one other fluid.

51. The method according to claim 50 where the mixture comprises methane and carbon dioxide where carbon dioxide has a diffusion time constant $t_{cA}$ of 0.04 second and methane has a diffusion time constant $t_{cB}$ of about 2.8 seconds.

52. The method according to claim 50 where the mixture comprises methane and nitrogen where nitrogen has a diffusion time constant $t_{cA}$ of 0.06 second and methane has a diffusion time constant $t_{cB}$ of about 2.8 seconds.

* * * * *

UNITED STATES PATENT AND TRADEMARK OFFICE
CERTIFICATE OF CORRECTION

PATENT NO.       : 7,645,324 B2
APPLICATION NO.  : 11/326657
DATED            : January 12, 2010
INVENTOR(S)      : Rode et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 713 days.

Signed and Sealed this

Sixteenth Day of November, 2010

David J. Kappos
*Director of the United States Patent and Trademark Office*